United States Patent [19]

Krabetz et al.

[11] 4,305,843

[45] Dec. 15, 1981

[54] PREPARATION OF COATED CATALYSTS

[75] Inventors: Richard Krabetz, Kirchheim; Heinz Engelbach, Limburgerhof; Peter Palm, Gerolsheim; Heinrich Spahn; Walter Herrmann, both of Mannheim, all of Fed. Rep. of Germany

[73] Assignee: BASF Aktiengesellschaft, Fed. Rep. of Germany

[21] Appl. No.: 126,384

[22] Filed: Mar. 3, 1980

[30] Foreign Application Priority Data

Mar. 12, 1979 [DE] Fed. Rep. of Germany ....... 2909670

[51] Int. Cl.$^3$ .................. B01J 23/31; B01J 23/22; B01J 23/85; B01J 23/88

[52] U.S. Cl. .................. 252/432; 252/437; 252/461; 252/464; 252/467; 252/468; 252/469; 252/470

[58] Field of Search ............... 252/432, 437, 461, 464, 252/467, 468, 469, 470; 427/427

[56] References Cited

U.S. PATENT DOCUMENTS 2,035,606  3/1936  Jaeger ................... 252/456
3,778,386  12/1973  Takenaka et al. ........... 252/432
3,956,377  5/1976  Dolhyj et al. ............. 252/462 X

FOREIGN PATENT DOCUMENTS 1385496  2/1975  United Kingdom .

Primary Examiner—W. J. Shine
Attorney, Agent, or Firm—Keil & Witherspoon

[57] ABSTRACT

A coated catalyst comprising (a) an inert carrier having particles of not less than 100 μm diameter and a surface area of up to 20 m$^2$/g and (b) a coating which contains the catalytic material and adheres firmly to the outer surface and to the edge zone, near the surface, of the carrier particles, can be prepared by applying the catalytic material as a 10–70% strength suspension in water to the agitated carrier particles, which are at below 70° C., if the suspension is sprayed, at a constant rate of from 0.01 to 2.0 kg of active material/hour/liter of carrier onto the carrier particles, while at the same time uniformly passing from 0.1 to 12 m$^3$ (S.T.P.)/hour/liter of carrier of an inert gas at from 20° to 300° C. over the carrier particles, under conditions such that the water only evaporates incompletely but the water content of the resulting coating is less than the maximum degree of saturation of the catalytic material.

5 Claims, No Drawings

PREPARATION OF COATED CATALYSTS

The present invention relates to a novel process for the preparation of a coated catalyst by spraying a suspension of a catalytic material in an easily evaporated wetting fluid onto agitated carrier particles.

British Pat. No. 1,346,943 discloses that coated catalysts comprising a carrier and a coating, applied thereto, of a catalytic material can be prepared by applying the catalytic material to the carrier by plasma spraying or flame spraying. A precondition for the applicability of the process is that one or more of the principal components should be fusible at the operating temperature of the flame-spraying gun or of the plasma torch. The process is carried out by introducing the active components, or the substances which at the operating temperature of the gun or torch can be decomposed into the desired oxidic and catalytically active compounds, into the flame or plasma jet in a conventional manner. The flame or plasma jet is directed onto the particles to be coated, which are preferably kept agitated, for example in a rotating drum. The catalysts thus produced are used, for example, for the oxidation of indans, the catalytic coatings applied to the carrier particles consisting of vanadium pentoxide or molybdenum oxide and/or tungsten oxide. The catalysts obtained, in a Comparative Example, by applying the coating in a conventional manner by atomizing, give a yield of only 13.8% whilst in the process of British Pat. No. 1,346,943 the yield is 45 percent.

Though the above process gives better yields than the conventional processes, it is not fully satisfactory. In plasma spraying and flame spraying, the active material must be fed pneumatically to the gun or torch. This type of feed requires a material which is very free-flowing, and the process is completely trouble-free only if the particle size range of the active material is from about 50 to 200 $\mu$m and the individual particles are substantially spherical. The industrial production of particles having this shape and this size distribution is difficult. It is best achieved by melting and subsequently spraying the active material in a stream of gas, the sprayed material of particle size <50 $\mu$m and >200 $\mu$m being recycled. Disadvantages of this method of producing the optimum particle size distribution are the high energy consumption and the expensive gas purification, by washing and electrostatic precipitators, which becomes necessary because of the toxicity of, for example, vanadium. However, similar expensive gas purification is also required when carrying out the flame-spraying process itself, since only 50–70% of the active material fed to the gun is fused onto the carrier balls; the remainder must be recovered from the off-gas. The principal disadvantage of the process is that the activity of the active materials produced from the melt is insufficient for many processes.

U.S. Pat. No. 3,956,377 discloses a special process for the preparation of coated catalysts for the gas phase oxidation of acrolein or methacrolein to acrylic acid or methacrylic acid, wherein, for example, molybdenum oxide, vanadium oxide and metallic tungsten powder are treated in water by refluxing and the resulting slurry is evaporated and the residue dried for several days at 115° C. The active catalyst material thus obtained is then applied to the carrier, which has previously been moistened with water, by tumbling the moist carrier in a powder of the active catalyst. Such a process is also disclosed in U.S. Pat. No. 4,077,912. Catalysts prepared in this way are frequently relatively inactive, in particular since the porosity of the carrier, and hence its water absorbency, limit the proportion of catalytic material in the coating. A further disadvantage of the method is that the degree of moistening of the particular surface layer during the coating process does not assume a stable value, and this detracts from the adhesion and leads to agglomeration of the particles, with formation of twins and triplets, and to varying thicknesses of coating.

Finally, U.S. Pat. No. 2,035,606 (page 3), British Pat. No. 1,385,496 and German Laid-Open Application DDS 2,626,887, (especially Examples 10–14), disclose that coated catalysts can be prepared by spraying aqueous suspensions of the catalytic material onto the agitated carrier particles, which can, for example according to U.S. Pat. No. 3,562,185 and British Pat. No. 1,385,496, be heated to above 150° C. or, when synthetic resin dispersions are additionally used, to about 70°–130° C. However, given the abrupt evaporation of the suspending medium if the carrier particles are at, for example, 150° C. or above, the coated catalysts obtained in general exhibit insufficient abrasion resistance of the catalytic coating and a large loss of active material during coating. If synthetic resin dispersions are used additionally, the coating process is made difficult by film-forming processes which are difficult to control and furthermore the synthetic resin must subsequently be burned away, which can result in a loosening of the structural lattice and to thermal impairment of the activity. In the process of German Laid-Open Application DOS 2,626,887, which can be carried out at 25°–80° C., agglomeration of the particles can easily occur.

We have found that coated catalysts comprising (a) an inert carrier having particles of not less than 100 $\mu$m diameter and a surface area of up to 20 m$^2$/g and (b) a coating which contains the catalytic material and adheres firmly to the outer surface and to the edge zone, near the surface, of the carrier particles, can advantageously be prepared by applying the catalytic material as a 10–70% strength suspension in water to the agitated carrier particles, which are at below 70° C., if the suspension is sprayed, at a constant rate of from 0.01 to 2.0 kg of active material/hour/liter of carrier onto the carrier particles, whilst at the same time uniformly passing from 0.1 to 12 m$^3$ (S.T.P.)/hour/liter of carrier of an inert gas at from 20° to 300° C. over the carrier particles, under conditions such that the water only evaporates incompletely but the water content of the resulting coating is less than the maximum degree of saturation of the catalytic material. If porous carriers are employed in the novel process, their mean pore diameter should preferably be greater than 20 $\mu$m and in that case the particle size of the catalytic material should be less than the mean pore diameter of the carrier. In that case it can be advantageous to pre-moisten the carrier with water, to 1–30% of its maximum water absorption (saturation value) before spraying it with the suspension of the catalytic material.

We have found, surprisingly, that the process according to the invention, in contrast to the conventional processes, gives coated catalysts with a very uniform distribution of the active material on the carrier particles, without agglomeration of the catalyst particles and with high abrasion resistance, even if the catalyst batches are produced on an industrial scale; these features lead to an improvement in the average selectivity without decrease in space-time yield of industrial-scale batches. A further surprising advantage of the process according to the invention is that when the proportion by weight of the active materials is greater than 100% and even 150% by weight, based on the carrier, and if the coating thickness is greater than 0.8 mm, coated catalysts with good abrasion resistance are still obtained; this is of importance when coated catalysts are used industrially for certain processes, for example the oxidation of isobutene to methacrolein.

The conventional carriers, such as aluminum oxides, silicon dioxide and silicates, eg. magnesium silicates or aluminum silicates, as well as silicon carbide, may be used for the novel process of preparation of coated catalysts. The carrier particles may or may not be molded, but molded carriers with a pronounced surface roughness, for examples balls or rings, are preferred. The diameter of the carrier particles should be not less than 100 μm and is preferably from 0.5 to 12 mm, especially from 2 to 9 mm. The carriers may be porous or non-porous, but porous carriers should have a mean pore diameter of not less than 20 μm and preferably not less than 50 μm. If the finished catalysts are to be employed for reactions which take place above about 350° C., it is preferred to use carriers which have an inner surface area of less than 5, especially of less than 2, m²/g, and which in general have a porosity of from 0 to 10%. If the finished coated catalysts are to be employed at temperatures below about 300° C., carriers with porosities greater than 10% may be advantageous. Carriers which exhibit a water absorption of less than 20% by weight, and especially of from 1 to 10% by weight, based on the weight of carrier, are preferred for the preparation of the novel coated catalysts.

The nature or composition of the catalytic material is not a specific factor in the novel process; in principle, any catalytic material can be applied to a carrier by the novel process. All known conventional catalyst materials, especially those suitable for highly exothermic reactions, and in particular those based on metal oxides, metal oxide mixtures and/or mixed metal oxides may be used; such materials are in particular employed for catalytic oxidation reactions, for example the catalytic oxidation of α-olefins, eg. propene and isobutylene, to α,β-olefinically unsaturated aldehydes, especially acrolein and methacrolein, or of hydrocarbons, eg. of butane or butene, to maleic anhydride, of o-xylene to phthalic anhydride and of o- and p-substituted alkylbenzenes to o- and p-substituted benzaldehydes, or the oxidative dehydrogenation of hydrocarbons or alcohols. Examples of such catalytic materials are described in British Pat. Nos. 1,491,750; 1,249,290; 1,351,218; 1,416,099; and 1,305,810. Catalytic materials of particular interest are those conventionally used for the oxidation of acrolein or methacrolein to acrylic acid or methacrylic acid, and which are based on oxides or mixed oxides which contain molybdenum, vanadium, tungsten, copper and/or iron as well as minor amounts of alkali metals and alkaline earth metals and may or may not contain other metal oxide components; such materials are in particular described in German Laid-Open Application DOS 2,626,887. A catalytic material of this type, conventionally prepared and calcined, preferably has the composition $$Mo_{12}V_aW_bA_cB_dO_x$$

where

A is Cu and/or iron,
B is Ni, Mn, Sn, Sb, Cr, Ca, Sr, Ba, Mg, Na, K, Rb, Cs and/or P,
a is from 0.5 to 16, preferably from 1 to 6,
b is from 0.1 to 8, preferably from 0.5 to 3,
c is from 0.5 to 6, preferably from 1 to 5, especially from 1.5 to 3,
d is from 0 to 3 and
x is the number of oxygen atoms required to saturate the valencies of the other constituents.

For the oxidation of methacrolein, it is particularly advantageous if B is an alkali metal or alkaline earth metal or especially P and d is from 0.1 to 3, whilst for the oxidation of acrolein these components should in general only be present in amounts corresponding to d being from 0 to 0.1. For the oxidation of methacrolein, active materials in which the basic components are molybdenum, vanadium, phosphorus and alkali metal are particularly suitable.

A calcined catalytic material suitable for the gas phase oxidation of olefins, especially propylene, preferably has the composition $$Mo_{12}Bi_aFe_bX_cY_dZ_eO_x$$

where
X is Ni and/or Co, with or without Sn, Zn and/or Mg,
Y is K, Na, Rb, Cs, In, Sb and/or Tl,
Z is P and/or B,
a is from 0.1 to 4, preferably from 0.2 to 3,
b is from 0.5 to 6, preferably from 1 to 4,
c is from 2 to 12, preferably from 4 to 11,
d is from 0.01 to 1, preferably from 0.04 to 0.5,
e is from 0 to 3, preferably from 0.01 to 2.5 and
x is the number of oxygen atoms required to saturate the valencies of the other constituents.

In general, in the case of X, the value for c should, for Sn, Zn and Mg together, be from 0 to 3, preferably from 0.5 to 3, whilst for Co-free catalytic material it should, conjointly for all other metals X, be from 6 to 11; the Ni content for Co-free catalytic material should correspond to a value of c of at least 6, even in the case of materials which additionally contain Sn, Zn and/or Mg.

Catalytic materials where Y is In plus one or more of the metals K, Rb and Cs are of particular interest for the gas phase oxidation of acrolein to acrylic acid under otherwise conventional conditions.

In the novel process, the catalytic material is as a rule applied in its finished catalytically active form, for example as a calcined mixed oxide which after calcination has been milled to the intended particle size. However, in some cases it is also advantageous if the calcination of the catalytic material is only carried out after the coated catalyst has been prepared. The particle size of the active catalytic material is less than 50 μm, with preferably 90% by weight of the material being in the form of particles smaller than 30 μm, in particular from 0.1 to 25 μm. If the catalysts are to contain metals as the active catalytic material, the metals may, if desired, be applied as oxides, in which case the resulting coated catalysts are reduced after drying; this reduction can be carried out immediately prior to their use in the industrial reactor. Preferably, however, the coating of the carrier is, even where metals are used, carried out with the active catalytic material, ie. with the catalytic metals (which may be precipitated onto oxidic components), so that an after-treatment is not necessary.

The catalytic material is in most cases applied as an aqueous suspension of from 10 to 70% strength, preferably from 25 to 60% strength. It is true that more dilute suspensions can be used, but in general this entails greater energy expenditure. Mixtures of water and water-miscible solvents, eg. alcohols, may also be used.

During application of the suspension to the agitated carrier particles, the latter are preferably executing a rolling motion, and the carrier is preferably at below 70° C., preferably at from 20° to 60° C. It has proved particularly advantageous to carry out the process in rotatable vessels, for example in coating drums, coating kettles or rotating dishes, of which the axis of rotation is preferably at an angle of from 30° to 60°. The vessels are preferably filled with the carrier particles to the extent of from 20 to 80% of the vessel volume, and the speed of revolution is preferably from 1 to 60 rpm. In general, before starting the coating operation, the carrier is brought to the desired temperature either indirectly or, preferably, directly by passing hot gas over it. The suspension is then sprayed, in accordance with the invention, through or over the agitated particles, the amount of suspension preferably corresponding to from 0.01 to 2.0, preferably from 0.1 to 1, kg of active material per hour per liter of carrier by means of, preferably, from 0.5 to 8 m$^3$ (S.T.P.) of an inert gas per hour per liter of carrier; the inert gas is in most cases air or nitrogen and is at from 20° to 300° C., preferably from 20° to 150° C. Preferably, the inert gas is passed through perforated walls of a rotating vessel, for example a rotating coating drum. If a two-material nozzle is used for spraying the suspension, the propellant gas introduced in general constitutes a part of the inert gas; if a sufficient amount of propellant gas is used it is possible, in exceptional cases, to dispense with additionally introduced inert gas, particularly since the coating drum can also be heated indirectly. The gas introduced according to the invention not only serves to provide the heat of vaporization required for the vaporization of water, but is also intended to take up the water continuously, in particular in such amount that the water content of the coatings formed around the carrier particles is from 30 to 95% of the maximum degree of saturation of the catalytic material and remains virtually constant during the suspension-spraying operation. Advantageously, the water content of the coating formed should be from 40 to 90%, especially from 50 to 85%, of this degree of saturation. The maximum degree of saturation of the catalytic material is the amount of water in grams which is taken up by 100 g of the catalytic material, in the form in which it is employed for the preparation of the coated catalyst according to the invention, under the following conditions: water is added dropwise in the course of from 5 to 10 minutes to 100 g of the powder stirred in a porcelain dish, until all the powder has agglomerated and the agglomerates become superficially slightly moist and tacky.

In view of the difficulty of determining the water content of the coating of porous carriers it is advantageous in practice to carry out the coating operation in such a way that the individual particles are just still able to roll as isolated particles through the spraying zone of the coating apparatus, ie. show no tendency to agglomerate.

During application of the catalytic material by suspension-spraying, the coating formed should thus neither dry out completely—which may for example occur due to an excessively high temperature and an excessively large amount of inert gas, nor should it be water-saturated, which may occur, for example, due to an excessively low temperature and/or insufficient amount of inert gas. A further condition that the water content of the coating formed should be virtually constant whilst the suspension is being sprayed onto the carrier requires, in practice, that the rate of introduction of the suspension and of the gas should not vary with time, and that the gas temperature should be constant. In this way, coatings which are particularly hard and abrasion-resistant are obtained, and furthermore agglomeration of the particles during the coating process is completely avoided. If porous carriers, whose liquid absorption is more than 20% of their weight, are used in the novel process, they are advantageously pre-moistened with from 1 to 30%, preferably from 1 to 25%, of their maximum saturation before spraying them with the suspension of the catalytic material. Such pre-moistening facilitates the establishment of constant working conditions at the start of the coating operation.

The amount of catalytic material on the carrier can vary within wide limits and as a rule differs for different active materials. In general, it is from 5 to 300, preferably from 6 to 200, percent by weight, based on the amount of carrier. The catalytic material forms a firmly adhering coating, in most cases from about 10 to 1,500 $\mu$m thick, on the outer surface of the carrier particles; in the case of porous carriers, this coating can also extend into an inner edge zone of the macropores near the surface of the carrier particles, down to a depth of 1,000 $\mu$m, especially of from 20 to 600 $\mu$m.

Whilst the suspension of the catalytic material is being sprayed onto the carrier, the material deposits on the carrier particles with partial evaporation of the water. Depending on the degree of pre-moistening, the porosity of the carrier particles and the particle sizes of the catalytic material in the suspension, there first occurs deposition in the macropores near the surface, constituting an inner edge zone, which may be relatively thin or relatively thick, of the particular carrier particles; the deposition on the outer surface takes place either subsequently or simultaneously. As a result of the agitation, for example the rolling, of the carrier particles, the catalytic composition which builds up solidifies on the outer surface to form a coherent, firmly bonded coating, which is very abrasion-resistant, especially after the final drying operation, which can take place at from 20° C. to about 140° C. Drying is advantageously carried out in the vessel in which the coating (ie. spraying) has been carried out, whilst agitating, for example rolling or shaking, the loose mass of catalyst particles and passing a heated inert gas, at from 20° to 300° C., over them, until the residual water content of the coated catalyst is, in general, less than 5%, preferably from 0.1 to 3%, especially from 0.2 to 2%, by weight, based on the total weight of the coated catalyst. An after-treatment, for example calcination, of the coated catalyst prepared according to the invention is readily possible but is in general not necessary.

EXAMPLE 1

(a) A catalytic material having the composition Mo$_{12}$V$_3$W$_{1.2}$Cu$_{2.2}$O$_x$ is prepared in a conventional manner by dissolving a solution of 32.3 kg of ammonium p-tung-state, 35 kg of ammonium metavanadate and 212 kg of ammonium heptamolybdate in 1,400 kg of water at 95° C., adding a solution of 26 kg of copper-II acetate in 350 kg of water and 10 kg of copper hydroxide carbonate and spray-drying the mixture at 110° C. The spray-dried powder is kneaded with 0.15 kg of water per part of powder and is dried at 140° C. It is then calcined, in a first stage, for 2½ hours at a temperature progressively rising from 230° to 350° C., and thereafter at 400° C. for a further 2½ hours. The calcined catalytic material is milled to a particle size of <30 μm. Its maximum water saturation value at 22° C. is 21%.

25 kg of the milled catalytic material are suspended in 16.7 kg of water. The constantly stirred suspension is sprayed onto 80 liters (equivalent to 88 kg) of carrier at a rate of 65.6 kg of suspension per hour, using a commercial self-cleaning two-material nozzle (spraying pressure 4 bar, amount of propellant air 19 m³/hour, air temperature 20°–25° C.). The carrier consists of α-aluminum oxide balls of 4.7 mm diameter, which have a maximum water absorption of 17% (porosity 34% and mean pore diameter 100 μm) and an inner surface area of 0.06 m²/g. The carrier particles are contained in a coating kettle of 200 liters capacity, which turns at 11 rpm and through which 400 m³/hour of air at 100° C. are passed during the spraying operation. This keeps the temperature in the coating kettle at 36°–40° C.

After completion of the spraying operation, air at 100° C. continues to be passed through the kettle until the loose material has come to about 90° C. and the moisture content of the coated catalyst obtained has dropped to about 0.8% (catalyst A). During the coating process, the mean water content is 81% of the maximum degree of saturation of the active material, calculated formally from the water content of the total sample and the amount of active material.

(b) The catalytic calcined material described under (a) is milled to a particle size of less than 30 μm and 16 g thereof are suspended in 16 g of water. The suspension is sprayed onto 100 g (100 ml) of α-aluminum oxide rings having an inner surface area of 0.05 m²/g (a water absorbency of 10% or a porosity of 26%)–85% of the pores having a diameter of from 50 to 1,500 μm—an external diameter of 8 mm, an internal diameter of 4 mm and a length of from 5 to 8 mm, the rings being present on a conventional rotating dish of 30 cm diameter, turning at 35 rpm. The suspension is sprayed at the rate of 30 g per hour and the amount of propellant gas is 750 liters (S.T.P.)/hour. During the coating process, the rings are heated to a mean temperature of 30° C. by indirect heating of the rotating dish. Where necessary, fluctuations in operating conditions during the spraying of the suspension are counterbalanced by slight changes in the spraying rate, so as to ensure that the increasingly heavily coated rings feel dry on the surface and roll as individual particles. After completion of spraying of the suspension of catalytic material, the coated catalyst is gradually heated to 140° C. in an oven, whilst passing air over the material, until the moisture content of the finished coated catalyst is 0.4% by weight. This product constitutes catalyst B.

Tests on coated catalysts $1_A$ and $1_B$ (a) Adhesion:
160 g portions of the coated catalyst are tumbled for 3 minutes in a rotating dish of 30 cm diameter at 35 rpm and the abrasion is determined gravimetrically. It is less than 0.1% by weight for catalyst A, and less than 0.08% by weight for catalyst B, based on active material.

(b) Adhesion during filling of reaction tubes:
1 liter portions of catalysts A and B are filled at a uniform rate, over 30 seconds, into a reaction tube of 3 m length and 25 mm diameter and are then run out again. The abrasion is determined as the proportion by weight of particles smaller than 2 mm and in each case proved to be less than 0.02% by weight.

(c) Oxidation of acrolein to acrylic acid:
The catalysts are employed in a conventional manner for the oxidation of acrolein to acrylic acid. The test conditions and the results after 200 hours' operation are listed in the Table below:

| Catalyst | Tube diameter | Amount of catalyst cm³ | Gas throughput liter (S.T.P.)/hour | Bath temperature °C. | Conversion | Yield, mole % of acrylic acid |
|---|---|---|---|---|---|---|
| A | 15 mm | 40 | Acrolein = 3.3<br>Air = 33<br>H₂O vapor = 25 | 260 | 99.7 | 97.2 |
| B | 26 mm | 60<br>40 | Acrolein = 33<br>Air = 33<br>H₂O vapor = 25 | 252<br>270 | 97<br>100 | 94<br>95 |

EXAMPLE 2

A catalytic material having the composition (in parts by weight) 1 V₂O₅.0.05 Sb₂O₃.0.01 K₂O is prepared by mixing potassium nitrate, vanadium oxide and antimony oxide as powders and heating the mixture to above the melting point of vanadium pentoxide (670° C.). The fluid melt is allowed to solidify in a sheet-metal trough and is then crushed and milled to a powder of particle diameter <30 μm. The maximum degree of water saturation of this catalytic material at 22° C. is 19.6% by weight.

6 g of the milled catalytic material are suspended in 12 g of water and the suspension is sprayed onto 100 g (100 ml) of α-aluminum oxide rings on a rotating dish. The dish revolves at 35 rpm, the temperature of the rings is kept at 26° C. and the spraying rate is 36 g of suspension per hour, using 750 liters (S.T.P.) of propellant gas/hour (22° C.). The aluminum oxide rings have an external diameter of 8 mm, an internal diameter of 4 mm and a length of from 5 to 8 mm. The inner surface area is 0.03 m²/g, the mean pore diameter is 70 μm and the water absorbency is 10%. During coating, the degree of moistening remains virtually constant at 86% of the maximum saturation value.

After spraying, the coated catalyst obtained is dried at 140° C. to a residual water content of 0.4% by passing air at 140° C. over the catalyst.

20 ml of the coated catalyst are introduced into a laboratory reactor and used for the reaction, at 406° C., of a gas mixture of 2 liters (S.T.P.) of p-tert.-butyltoluene, 20 liters (S.T.P.) of air and 15 liters (S.T.P.) of water vapor per hour. The yield of p-tert.-butylbenzaldehyde is 7.4 mole %, the yield of p-tert.-butylbenzoic acid 7.1 mole % and the conversion 23.2%. The combined selectivity, for the two products together, is 62.5 mole %.

The coated catalyst is very abrasion-resistant and its abrasion loss, tested on a 100 g sample by the method described in Example 1(a), is only 0.05%, based on active material.

EXAMPLE 3

A catalytic material having the composition $Mo_{12}NiCo_7Fe_3BiB_2Sb_{0.1}K_{0.14}O_{56.7}$ is prepared in accordance with Example 1 of British Pat. No. 1,491,750. The material is milled to a particle size of <30 μm. The maximum degree of water saturation of this catalytic material is 33.4% at 22° C.

157 g of the milled catalytic material are suspended in 143 g of water and the suspension is sprayed, at a rate of 160 g/hour, onto 100 g (76 cm³) of steatite balls having a diameter of from 1.5 to 2.5 mm and a porosity of 1%. During spraying, the carrier is on a rotating dish which has a diameter of 30 cm, revolves at 35 rpm and is indirectly heated at 40°–50° C. The suspension is sprayed through a two-material atomizing nozzle, using 750 liters (S.T.P.) of air/hour, at 22° C., as the propellant gas. The water content during coating averages 77% of the maximum degree of saturation. After completion of spraying, the coated catalyst obtained is dried for 16 hours at 80° C. to give a residual water content of 0.6%.

To test the coated catalyst obtained, 43 cm³ of the catalyst, in a reaction tube of 12 mm diameter contained in a salt bath, are charged with a gas mixture of 3 liters (S.T.P.) of isobutene, 36 liters (S.T.P.) of air and 28 liters (S.T.P.) of nitrogen per hour, at 392° C.; the isobutene is oxidized to methacrolein and methacrylic acid. The conversion is 93.6 mole % and the yields are 80 mole % of methacrolein and 1.5 mole % of methacrylic acid. The selectivity, based on the sum of the two products, is 87 mole %.

If the reactor is operated at 268° C. and a gas mixture of 3 liters (S.T.P.) of isobutene, 37 liters (S.T.P.) of air and 24 liters (S.T.P.) of water vapor is passed over the catalyst per hour, the yield is 81 mole % of methacrolein and 1.5 mole % of methacrylic acid, with a combined selectivity of 84 mole %.

The abrasion resistance of the coated catalyst, measured on a 100 g sample by the method described in Example 1(a), is 0.1%.

EXAMPLE 4

A pulverulent mixture of 24.06 g of $V_2O_5$ and 0.44 g of $H_6TeO_6$ is fused at 670° C. by the method described in Example 1 of British Pat. No. 1,381,144. After the material has cooled, it is crushed and milled to a powder of particle size <30 μm.

The catalytic material thus obtained is suspended in 25 g of water and sprayed, under the conditions described in Example 2, onto 343 g of mullite balls of 5–7 mm diameter.

The coated balls are dried to 0.2% residual moisture content.

The abrasion loss of the finished catalyst, determined by the method described in Example 1(a), is about 0.1%, based on active material.

The catalyst is exceptionally suitable for the gas phase oxidation of 1-methyl-3-phenylindan to anthraquinone at 440° C.

We claim:
1. In a process for the preparation of a coated catalyst consisting essentially of
   (a) an inert carrier having particles of not less than 100 μm diameter and a surface area of up to 20 m²/g and
   (b) a coating consisting essentially of the catalytic material which adheres firmly to the outer surface and to the edge zone, near the surface, of the carrier particles by applying the catalytic material as a 10–70% strength suspension in water to the agitated carrier particles, which are at below 70° C., the improvement that the suspension is sprayed, at a constant rate of from 0.01 to 2.0 kg of active material/hour/liter of carrier onto the carrier particles, while at the same time uniformly passing from 0.1 to 12 m³ (S.T.P.)/hour/liter of carrier of an inert gas at from 20° to 300° C. over the carrier particles, under conditions such that the water only evaporates incompletely and the water content of the resulting coating is 30 to 95% of the maximum degree of saturation of the catalytic material.

2. The process of claim 1, wherein a porous carrier having a mean pore diameter of greater than 20 μm is employed, and the particle size of the catalytic material is less than the mean pore diameter of the carrier.

3. The process of claim 1 or 2, wherein the carrier is pre-moistened with water to 1–30% of its maximum water absorbency before spraying it with the suspension of the catalytic material.

4. The process of claim 1, wherein the catalytic material has the composition $$Mo_{12}V_aW_bA_cB_dO_x$$

where
A is Cu and/or iron,
B is Ni, Mn, Sn, Sb, Cr, Ca, Sr, Ba, Mg, Na, K, Rb, Cs and/or P,
a is from 0.5 to 16,
b is from 0.1 to 8,
c is from 0.5 to 6,
d is from 0 to 3 and
x is the number of oxygen atoms required to saturate the valencies of the other constituents.

5. The process of claim 1, wherein the catalytic material has the composition $$Mo_{12}Bi_aFe_bX_cY_dZ_eO_x$$

where
X is Ni and/or Co, with or without Sn, Zn and/or Mg,
Y is K, Na, Rb, Cs, In, Sb and/or Tl,
Z is P and/or B,
a is from 0.1 to 4,
b is from 0.5 to 6,
c is from 2 to 12,
d is from 0.01 to 1,
e is from 0 to 3 and
x is the number of oxygen atoms required to saturate the valencies of the other constituents.

* * * * *